United States Patent [19]

Klar (minor)

[11] Patent Number: 5,692,792

[45] Date of Patent: Dec. 2, 1997

[54] EXPANDABLE STORAGE SYSTEM FOR A VEHICLE

[75] Inventor: Dor Klar (minor), 29/20 Hashahar Street Hod Hasharon 45325, Israel, Geula Klar, legal guardian

[73] Assignee: Geula Klar, Hod hasharon, Israel

[21] Appl. No.: 609,439

[22] Filed: Mar. 1, 1996

[30] Foreign Application Priority Data

Mar. 1, 1995 [IL] Israel .......................................... 112829

[51] Int. Cl.$^6$ .................................................. B62D 33/08
[52] U.S. Cl. ........................... 296/26; 296/37.16; 296/56
[58] Field of Search ................................ 296/37.16, 26, 296/56, 165

[56] References Cited

U.S. PATENT DOCUMENTS

| | | | |
|---|---|---|---|
| 2,097,911 | 11/1937 | Becker | 296/26 |
| 2,172,405 | 9/1939 | Powell | 296/26 |
| 2,284,419 | 5/1942 | Greig | 296/26 |
| 3,004,790 | 10/1961 | Mayer | 296/26 |
| 4,413,854 | 11/1983 | Hirshberg | 296/37.16 |
| 5,564,767 | 10/1996 | Strepek | 296/26 |

FOREIGN PATENT DOCUMENTS

| | | | |
|---|---|---|---|
| 1570035 | 6/1969 | France | 296/26 |
| 3201413 | 9/1983 | Germany | 296/26 |
| 92940 | 5/1985 | Japan | 296/165 |
| 197756 | 5/1938 | Switzerland | 296/26 |

OTHER PUBLICATIONS

Hoyt, Wade, "Freewheeling," Popular Mechanics, p. 36, May 1986.

*Primary Examiner*—Gary C. Hoge
*Attorney, Agent, or Firm*—Helfgott & Karas, PC.

[57] ABSTRACT

For a vehicle having a rear storage compartment which has side walls and a floor area, and wherein access is gained to the storage compartment via a rear opening across which is mounted an upwardly opening tailgate for selectable closing and opening of the rear opening, an expandable storage system having an extendible storage member which includes a floor portion for supporting luggage thereon, the floor portion having front and rear edges and side edges extending therebetween, and a pair of parallel side wall portions connected to the side edges of the floor portion so as to extend transversely upward therefrom, thereby to prevent undesired lateral movement of luggage supported thereon; the storage system also having apparatus for mounting the extendible storage member within the storage compartment such that the pair of side walls have a generally parallel orientation to the side walls of the storage compartment, including apparatus for permitting selectable movement of the extendible storage member along an axis parallel to the side walls between retracted and extended positions, wherein, in the retracted position, the extendible storage member is contained entirely within the vehicle storage compartment for storing luggage therewithin, and wherein, in the extended position, the extendible storage member protrudes rearwardly from the storage compartment through the rear opening so as to expose a major portion of the floor of the vehicle storage compartment and thereby to increase the total floor area available for storage.

18 Claims, 4 Drawing Sheets

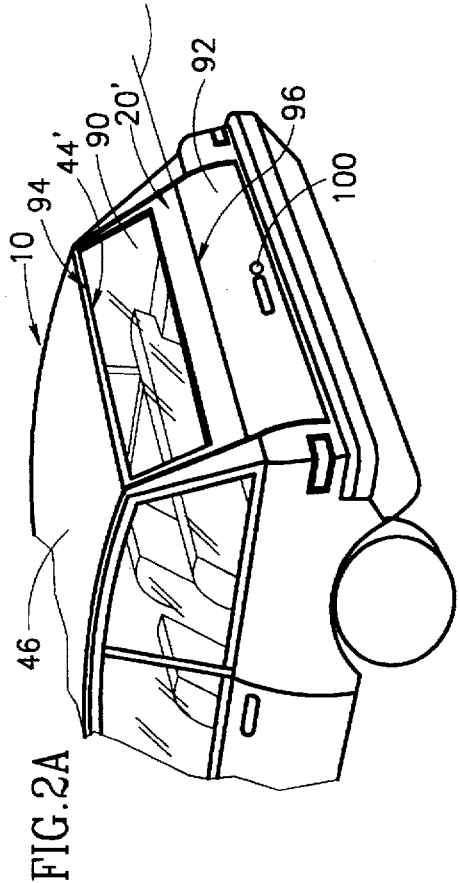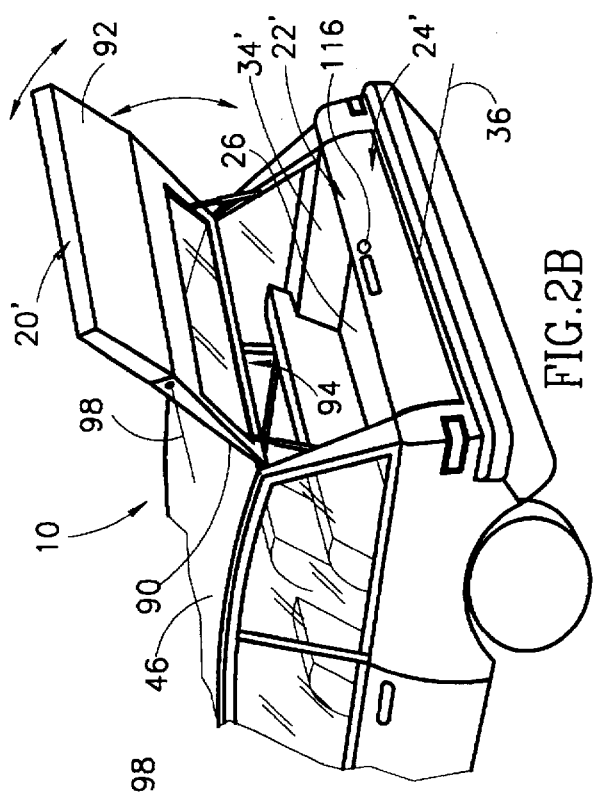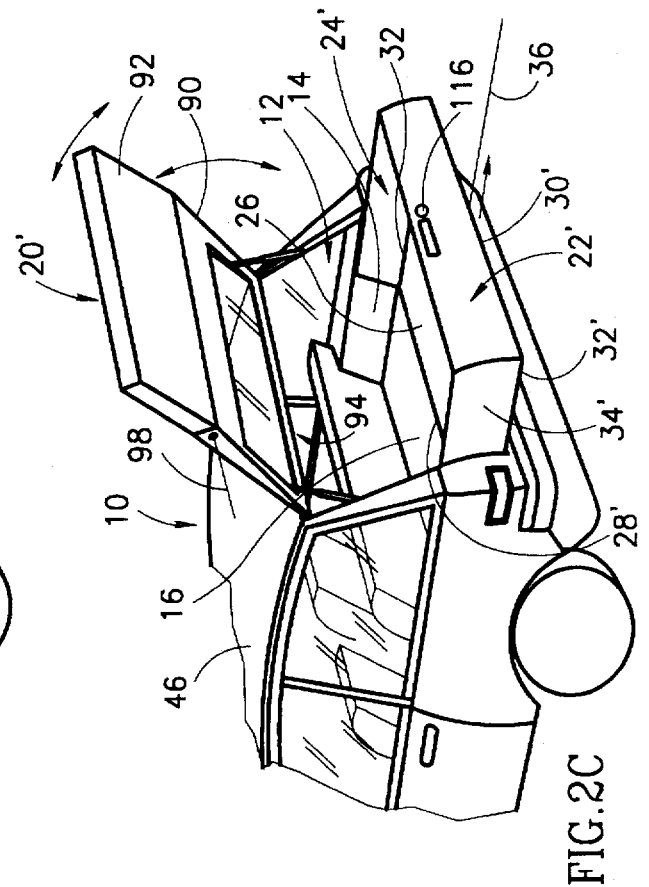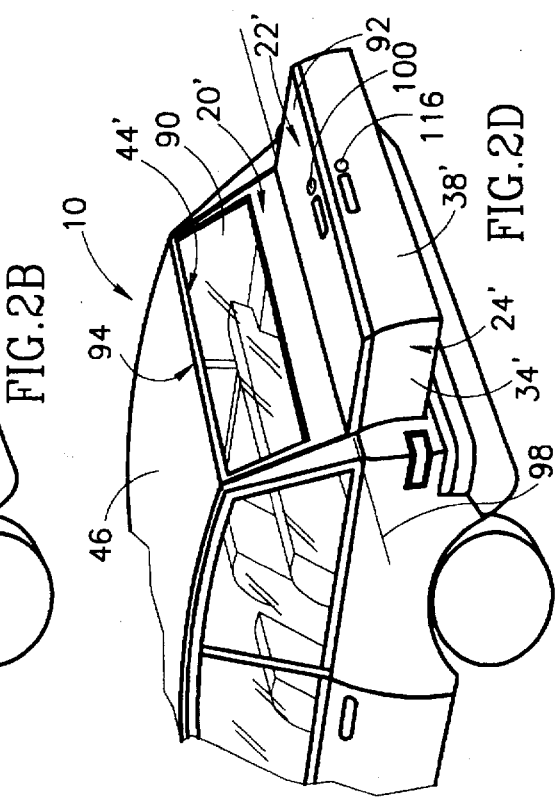

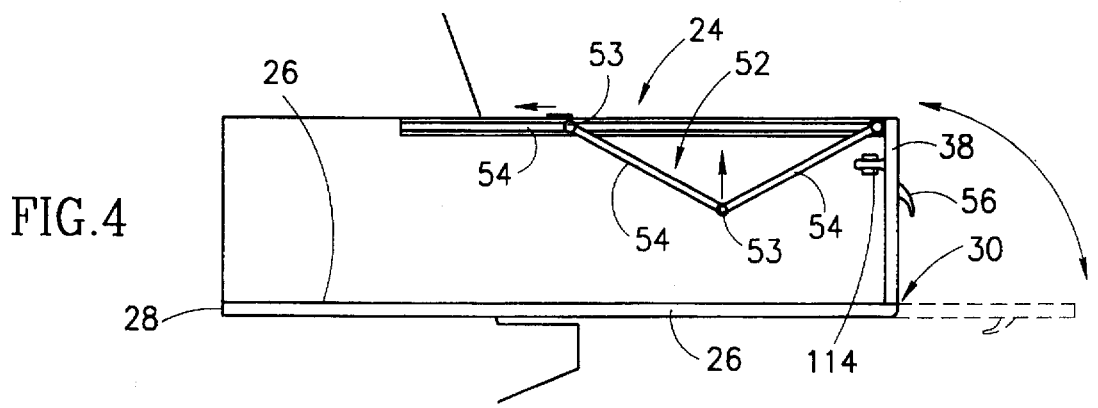
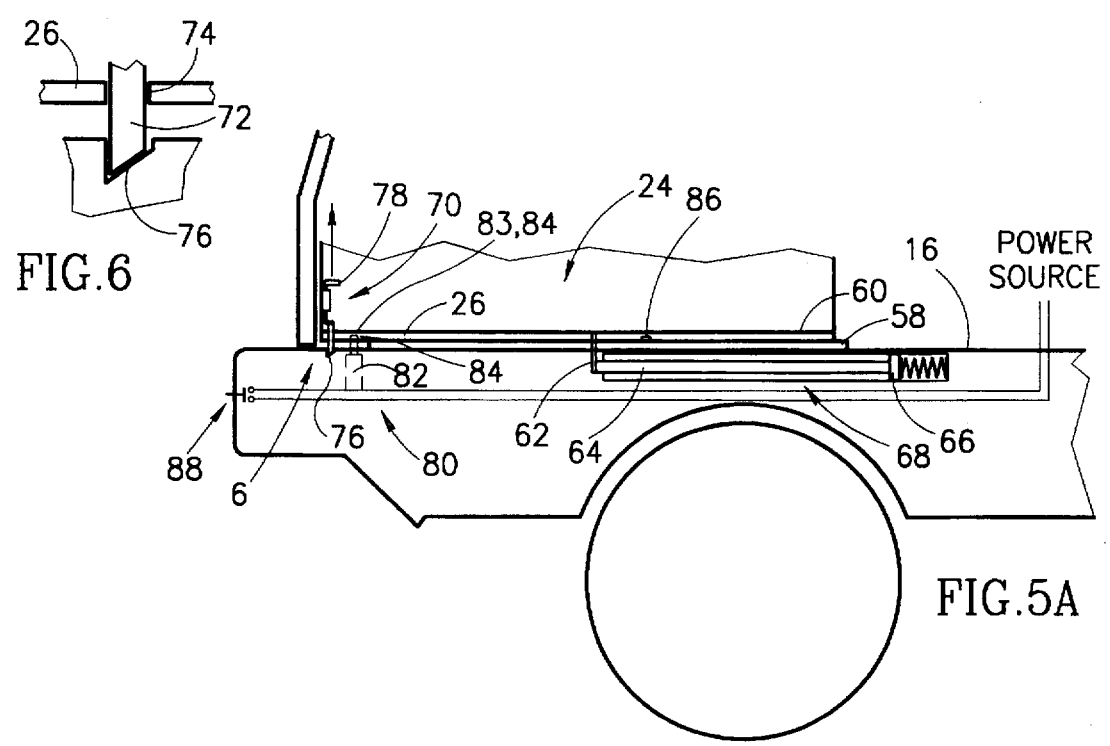
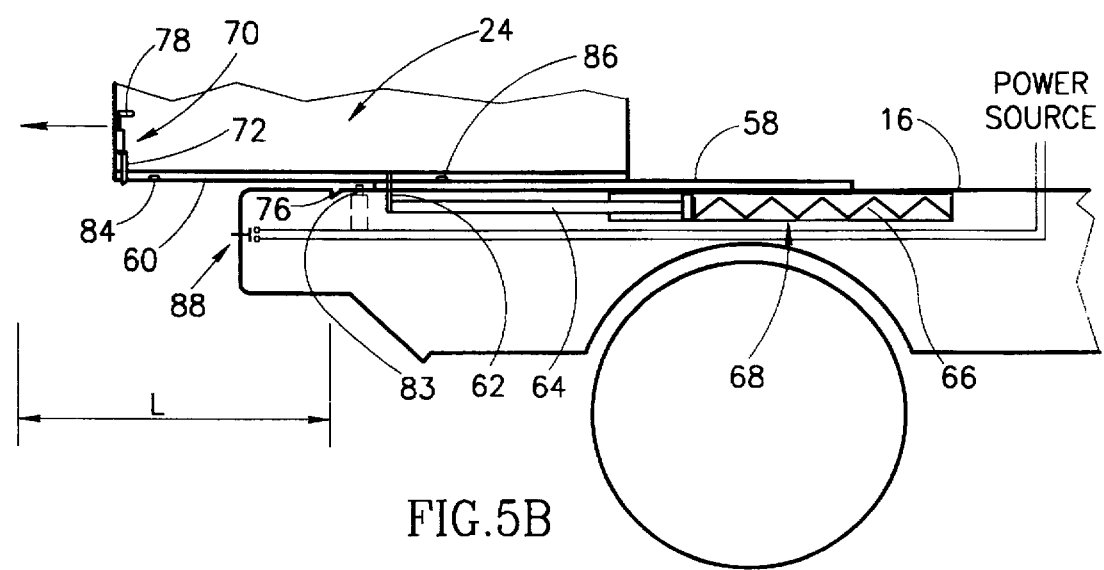

EXPANDABLE STORAGE SYSTEM FOR A VEHICLE

FIELD OF THE INVENTION

The present invention relates to storage compartments in vehicles, and particularly to those in closed vehicles such as automobiles.

BACKGROUND OF THE INVENTION

The vast majority of closed land vehicles, such as automobiles and the like, are constructed so as to have a rear storage or luggage compartment; known also as a "trunk" or a "boot". For the purpose of clarity, the term "storage compartment" is used throughout the following specification and claims.

In many vehicles, particularly of the type known as a "station wagon" or "estate car", the storage compartment provides ample space for carrying luggage and other loads or goods. In other vehicles, however, of the "compact" or "tailgated" type, the size of the storage compartment is usually reduced so as to maximize the passenger compartment.

Various solutions have been attempted in order to increase the mount of available storage space in compact cars. This is normally provided, however, by imparting to the passenger compartment and storage compartment an integrated flexible layout, whereby the back portions of the second row of seats can be folded down if desired, thereby to temporarily increase the amount of space available for storage.

While this flexibility is certainly a useful feature of compact cars, it does not solve the basic problem of a shortage of storage space. For example, when the rear seats are occupied by passengers, the storage space is very limited, and the seat backs cannot, obviously, be folded down.

SUMMARY OF THE INVENTION

The present invention seeks to provide an expandable storage system for vehicles having a rear storage compartment, which is mounted permanently within the storage compartment and which is easily and instantly expandable so as to increase the amount of available storage space in the vehicle, and which, once mounted, requires no assembly or disassembly, and which, further, when in a fully retracted position and thus contained entirely within the vehicle storage compartment does not substantially reduce the storage capacity thereof.

While the additional storage space provided by the present invention my be most advantageous in "compact cars", it is intended also for use in other types of vehicle with tailgates or rear doors. Accordingly, the term "tailgated vehicle" is used throughout the following description to include all types of vehicles with tailgates, such as station wagons, as well as compact cars.

There is thus provided, in accordance with a preferred embodiment of the invention, an expandable storage system for a vehicle having a rear storage compartment which has side walls and a floor area, and wherein access is gained to the storage compartment via a rear opening across which is mounted a tailgate for selectable closing and opening thereof.

The system includes an extendible storage member which has a floor portion for supporting luggage thereon, the floor portion having front and rear edges and side edges extending therebetween; and a pair of parallel side wall portions connected to the side edges of the floor portion so as to extend transversely upward therefrom, thereby to prevent undesired lateral movement of luggage supported thereon;

and further includes apparatus for mounting the extendible storage member within the storage compartment such that the pair of side walls have a generally parallel orientation to the side walls of the storage compartment, including apparatus for permitting selectable movement of the extendible storage member along an axis parallel to the side walls between retracted and extended positions.

In the retracted position, the extendible storage member is contained entirely within the vehicle storage compartment for storing luggage therewithin, and in the extended position, the extendible storage member protrudes rearwardly from the storage compartment through the rear opening so as to expose a major portion of the floor of the vehicle storage compartment and thereby to increase the total floor area available for storage.

Additionally in accordance with a preferred embodiment of the invention, the extendible storage member has front and top openings, and wherein the system also includes apparatus for selectably closing at least the top opening, thereby to permit loading of luggage therethrough.

In accordance with one embodiment of the invention, the extendible storage member also has a rear wall associated with the rear edge of the extendible storage member, and wherein, in the retracted position, the extendible storage member rear wall is flush with the vehicle rear opening thereby to extend across the width thereof and so as also to extend upward so as to leave a predetermined portion of the vehicle rear opening uncovered.

Preferably, there is also provided a tailgate which is operative, in a closed position, to extend across and close the uncovered portion of the vehicle rear opening.

In accordance with a further embodiment of the invention, the extendible storage member extends across the width of the vehicle storage compartment and further extends upward such that when the extendible storage member is in the extended position, a predetermined portion of the vehicle rear opening remains uncovered,

- and the tailgate includes upper and lower portions, the upper portion being hingedly attached along an upper edge thereof to a roof potion of the vehicle adjacent to the rear opening, and the lower portion being hingedly attached to a lower edge of the upper portion, along a hinge axis generally parallel to the vehicle storage compartment floor,
- wherein, when the extendible storage member is in the retracted position, the tailgate may be closed so as to extend across the entire rear opening of the vehicle storage compartment, and further,
- when the extendible storage member is in the extended position, the lower portions extends across the top opening of the extendible storage member, thereby to close it.

In accordance with yet one additional embodiment of the invention, the extendible storage member side walls have top edge portions which are configured to meet with predetermined portions of the tailgate so as to define common interfaces therebetween.

BRIEF DESCRIPTION OF THE DRAWINGS

The present invention will be more filly understood and appreciated form the following detailed description, taken in conjunction with the drawings, in which:

FIGS. 2A–2D are partial rear views of a tailgated vehicle including an expandable storage system, constructed and operative in accordance with a second preferred embodiment of the invention, in various operative positions;

FIG. 4 is a partial side-section of the extendible storage member seen in FIG. 1C, taken along line 4—4 therein, showing the cover element of the extendible storage member in a partially extended position;

FIGS. 5A and 5B are schematic partial illustrations showing the sliding, locking and release mechanisms of the extendible storage member of the present invention; and Fib. 6 is an enlarged detail of the catch mechanism as seen in FIG. 5A, at location 6 therein.

DETAILED DESCRIPTION OF THE INVENTION

Figure 1A:
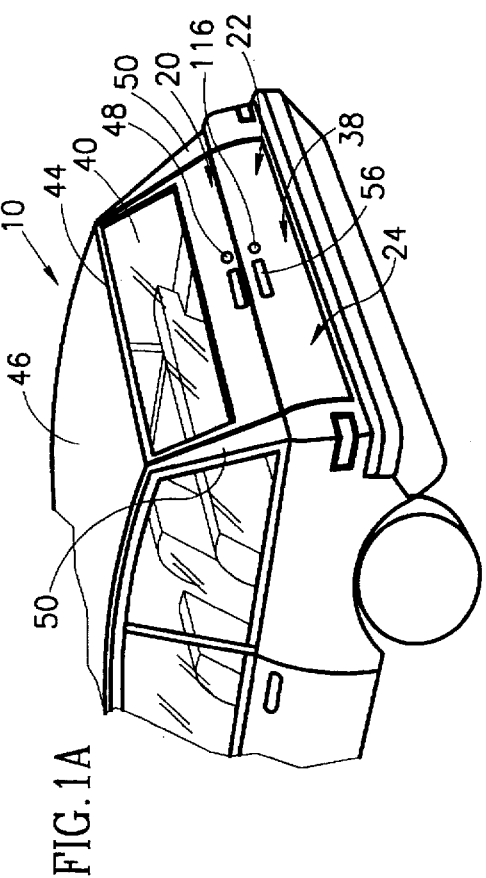
FIGS. 1A–1D are partial rear views of a tailgated vehicle including an expandable storage system, constructed and operative in accordance with a first preferred embodiment of the invention, in various operative positions.

Referring now to FIGS. 1A–3D, there is seen an expandable storage system for a tailgated vehicle, constructed and operative in accordance with the present invention. The following description relates to all three basic embodiments of the invention shown respectively in FIGS. 1A–1D, FIGS. 2A–2D and FIGS. 3A–3D. Components common to all three illustrated embodiments are indicated in the drawings by similar reference numerals, except that in FIGS. 2A–2D, these reference numerals bear a prime (') suffix and in FIGS. 3A–3D, these reference numerals bear a double-prime (") suffix. Detailed descriptions of particular features or characteristic peculiar to particular embodiments are described below in conjunction with the drawings in which they are illustrated.

As seen, the vehicle, referenced 10, has a rear storage compartment, referenced generally 12 (FIGS. 1C, 2C and 3C), which has side walls 14 and a floor 16. Access to the storage compartment 12 is gained via a rear opening across which is mounted a tailgate 20 for selectable closing and opening thereof.

The expandable storage system, referenced generally 22, includes, as seen also in FIG. 4, an extendible storage member 24 which has a floor portion 26 (FIGS. 1B, 2B, 2C, 3B, 3C and 4) defining front and rear edges 28 and 30 and side edges 32 (FIGS. 2C, 3C and 4), and a pair of parallel side walls 34 connected to the side edges 32 of floor portion 26 so as to extend transversely upward therefrom, thereby to prevent undesired lateral movement of luggage supported thereon. As seen, storage member 24 is mounted within the storage compartment 12 such that its side walls 34 are generally parallel to the storage compartment side walls 14, and so as to be selectably movable relative to the storage compartment along an axis 36, between retracted and extended positions.

Figure 3A:
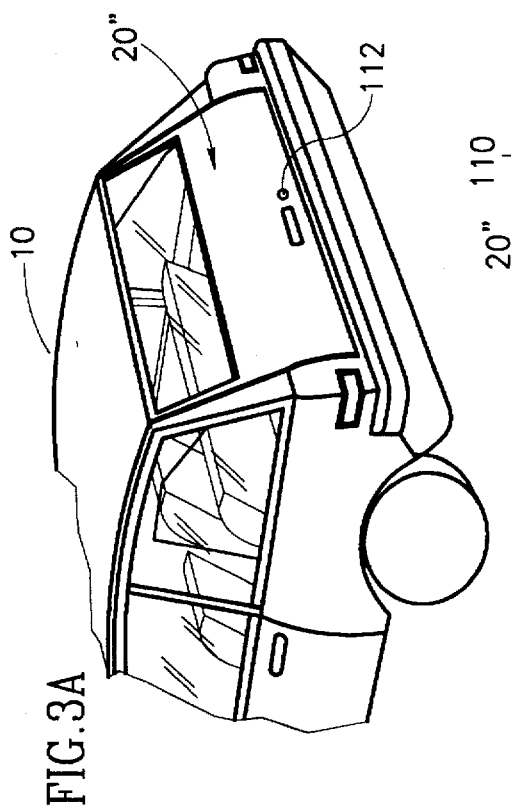
FIGS. 3A–3D are partial rear views of a tailgated vehicle including an expandable storage system, constructed and operative in accordance with a third preferred embodiment of the invention, in various operative positions.
Figure 3B:
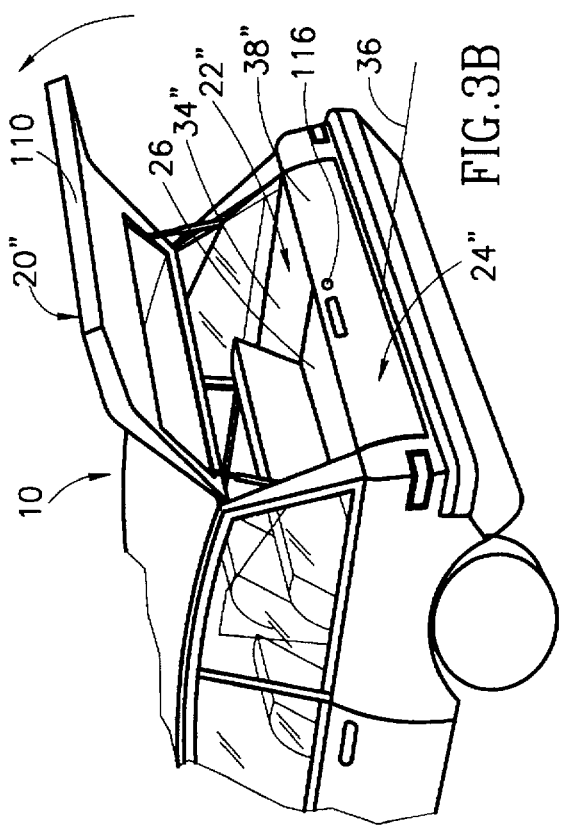
Figure 3C:
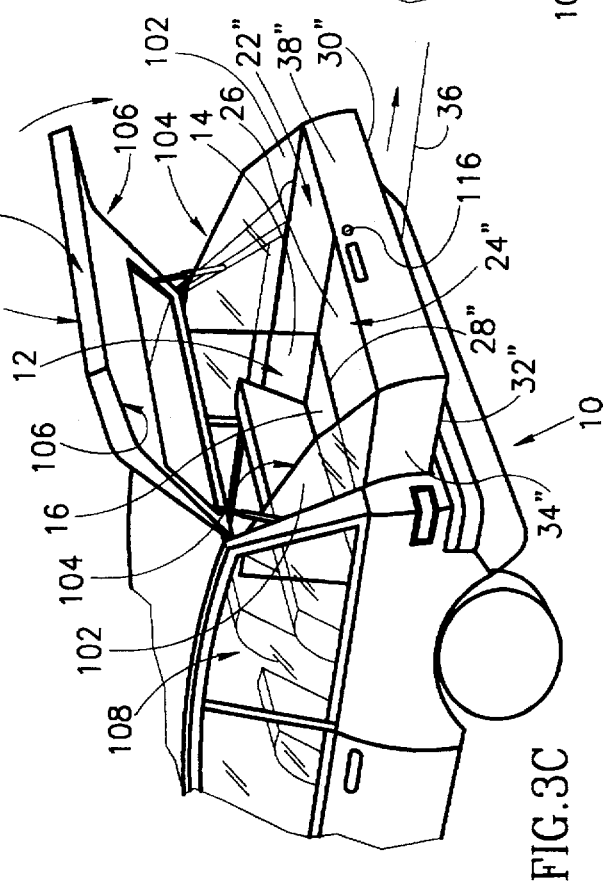
Figure 3D:
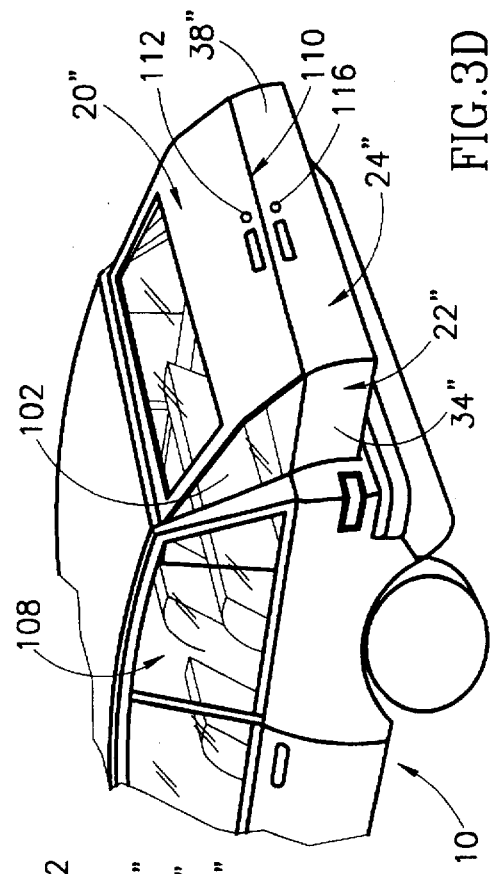

As seen in FIGS. 1A, 2A and 3A, when the storage member 2, is an a fully retracted position inside the storage compartment 12, it is entirely contained therewithin, and the tailgate 20 may be closed completely and properly. The top of storage member 24 is normally not covered and, further, the shape of the storage member is similar to that of the interior of the storage compartment 12. Accordingly, as seen in FIGS. 1B, 2B and 3B, when the storage member 24 is fully retracted, it nontheless provides an available storage space not substantially less than that provided by the original vehicle storage compartment 12.

Expansion of the storage space is provided by extension of the storage member 24 along axis 36, such that it protrudes rearwardly from the storage compartment 12 through the rear opening thereof so as to expose a major portion of the floor 16 of the vehicle storage compartment 12 and thereby to increase the total floor area available for storage.

Figure 1B:
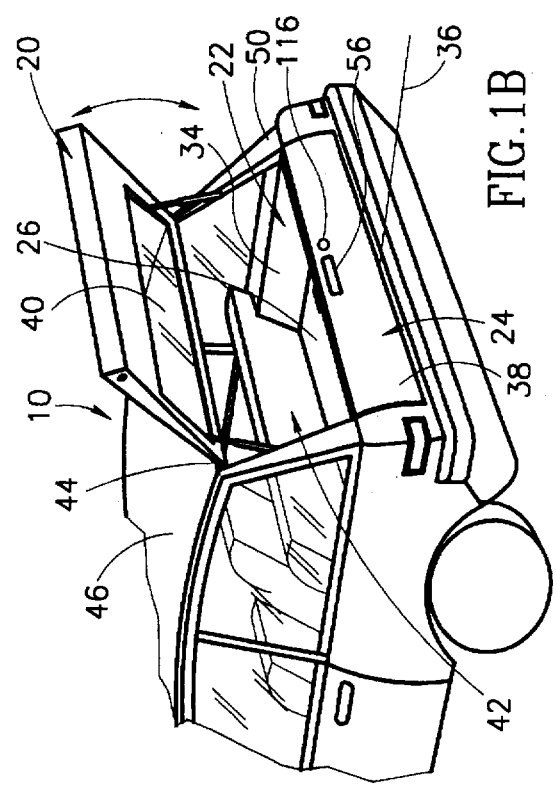

Referring now particularly to FIGS. 1A–1D, it is seen that storage member 24 has a rear wall 38 associated with it rear edge 30, which remains exposed even when in the fully retracted position seen in FIGS. 1A and 1B. Tailgate 20 is configured to as to consist mainly of a rear window portion 40, and so as to extend across the opening 42 (FIG. 1B) that remains between rear wall 38 and a rear edge portion 44 of the vehicle roof 46 when storage member 24 is retracted. Accordingly, tailgate 20 is also provided with a lock, indicated schematically at 48 (FIGS. 1A and 1D) by which it can be securely locked, typically to upright members 50 of the vehicle.

Figure 1C:
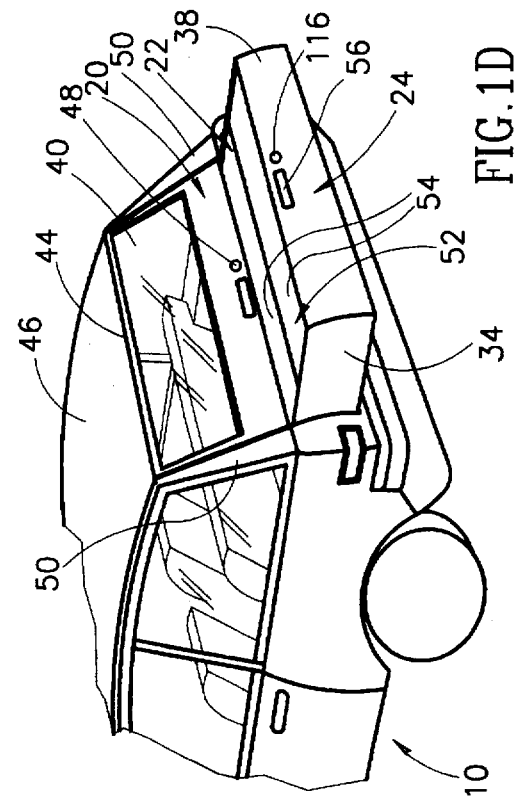
Figure 1D:
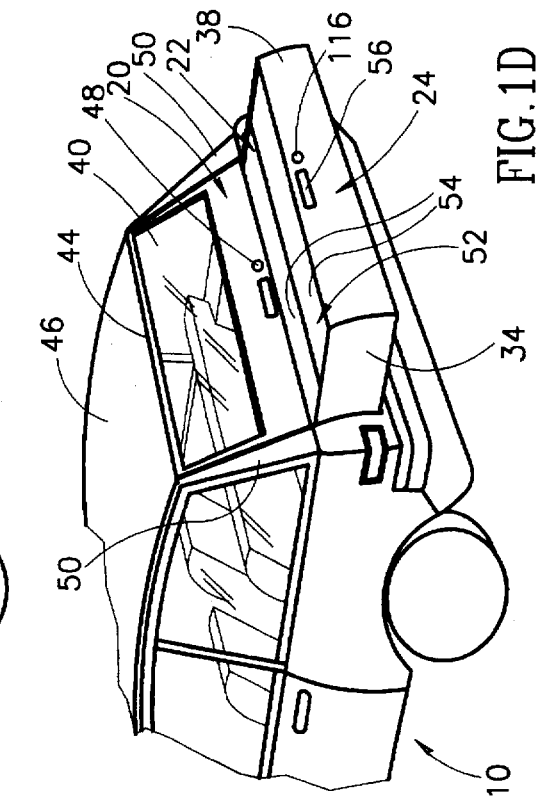

Referring now to FIGS. 1C, 1D and 4, there is also provided a covering 52 for covering the top opening of the storage member 24. This covering may be most useful when storage member 24 is in an extended position, although it may also be useful for hiding stored objects from view when storage member 24 is in a retracted position. As seen, in the present example, covering 52 is a concertina-type covering, formed of a plurality of articulated slats 54 mounted via a corresponding plurality of rod members 53 (FIG. 4) in tracks 55. A handle 56 may also be provided for enabling extension of the covering 52, as seen in FIG. 4, to the extent required to cover the rearwardly projecting portion of storage member 24, seen in FIG. 1D.

It will be appreciated that the illustrated concertina-type covering 52 is for example only, and that any other type of suitable covering be used in accordance with alternative embodiments of the invention.

Referring now to FIGS. 5A and 5B, floor storage member 24 is mounted for sliding extension from storage compartment 12 via one or more interlocking first and second track members 58 and 60. First track members 58 are attached to the vehicle storage compartment floor 16, and second track members 60 are attached to the underside of the storage member 24. Extension and retraction of storage member 24 is performed by sliding of second track members 60 along first track members 58, such that, inter alia, when storage member 24 is extended, it is supported—both vertically and horizontally—by first track members 58. The extent of the overhang "L" (FIG. 4) of storage member 24 beyond the rear of the vehicle is normally limited to no more than about 60 cm, for example, particularly when being used with a "compact" car, although the invention is not specifically limited to this.

While extendible storage member 24 may be extended and retracted completely manually, in accordance with one embodiment of the invention, this is performed at least partially automatically.

With further reference to FIGS, 5A and 5B, it is thus seen that, in the illustrated embodiment, storage member 24 has attached thereto a downwardly extending flange 62. Flange 62 is provided in touching contact with resilient compression apparatus, exemplified herein by a piston 64 arranged in cooperation with a resilient compression member 66, such as a compression spring. This, of course, may be replaced by any suitable compression apparatus, such as gas-filled compression apparatus. Preferably, the compression apparatus is installed in a suitable recess 68 provided in the floor 16 of the vehicle storage compartment 12, although it may alternatively be affixed to a surface of floor 16.

It will thus be appreciated that, in an extended position, as seen in FIG. 5B, compression member 66 is substantially untensioned. When storage member 24 is retracted, however, into storage compartment 12, flange 62 acts to compress compression member 66 via piston 64, until the storage member 24 is brought into a completely retracted position, and may be locked thereat, as described below. As soon as storage member 24 is unlocked, compression member 66 acts to urge piston 66 and flange 62, and thus storage member 24, outwardly along track member 58, thereby to bring storage member 24 into its extended position.

As described, there is provided locking apparatus for locking storage member 24 in the retracted position, as seen in FIG. 5A.

In accordance with a first embodiment of the invention, there is provided manual locking apparatus, referenced 70. Apparatus 70 includes a spring-biased catch member which is affixed ire the interior surface of rear wall 38 of storage member 24. With reference now also to FIG. 6, a tongue element 72 of catch member 70 extends through an opening 74 formed in floor portion 26 of the storage member 24, so as to be engageable with an angular recess 76 formed in floor portion 16 of the vehicle storage compartment. Opening 74 and recess 76 are formed to be in mutual registration when storage member 24 is in its retracted position.

Catch member 70 is operative to normally urge tongue element 72 in a downward direction such that, when brought into registration with recess 76, tongue element 72 becomes engaged therewith, as seen in enlarged detail in FIG. 6, thereby to lock storage member 24 in the retracted position. Release of tongue element 72 from recess 76 is provided by pulling in an upward direction a lever 78 connected to tongue element 72, thereby to permit automatic extension of storage member 24 by the above-described compression apparatus. It will be appreciated that, when storage member 24 is once again retracted, in the absence of application to tongue element 72 of an upward pulling force, it will automatically engage and become locked with recess 76, thereby locking storage member 24 in its retracted position.

In accordance with an alternative embodiment of the invention, there is provided electrically controlled automatic locking apparatus, referenced 80. Apparatus 80 typically includes an electrically-activated, normally open solenoid 82 which is located preferably in the floor 16 of the vehicle storage compartment. An upwardly extending, retractable, solenoid element 83 is operative to be in either a first, extended position, whereat it engages a recess 84 provided in the underside of floor portion 26 of storage member 24, thereby to lock the storage member in its retracted position, seen in FIG. 5A, or in a second, retracted position, whereat it is not in engagement with recess 84, thereby permitting extension and retraction of storage member 24, as desired. There may also be provided a further, forwardly-located recess 86 formed in the underside of floor potion 26 of storage member 24, such that, when storage member 24 is moved to its fully extended position, recess 86 is brought into registration with solenoid element 83, thereby to lock it in the extended position.

It will be appreciated that, as, in the present example, the solenoid is normally open, each time that it is wished to permit movement of the storage member, between retracted and extended positions, an electrical circuit has to be completed, such as by activation of a suitable control switch 88.

The embodiments of FIGS. 2A–2D and 3A–3D are similar to the embodiments of the invention described above in conjunction with FIGS. 1A–1D and 4–6, except as specifically described hereinbelow.

Accordingly, referring first to FIGS. 2A–2D, tailgate 20' is characterized by being of full size construction, as seen in FIGS. 3A–3D, but having upper and lower portions, respectively referenced 90 and 92. Upper potion 90 is hingedly attached along an upper edge thereof 94 to rear edge 44' of vehicle roof 46, and lower portion 92 is hingedly attached to a lower edge 96 of upper potion 90 along a hinge axis 98 generally parallel to the vehicle storage compartment floor 16.

As seen in FIGS. 2C and 2D, after storage member 24' has been extended, tailgate 20' is closed such that upper potion 90 thereof resumes its normal position, whereas lower potion 92 is folded so as to cover storage member 24. Preferably, lower portion 92 fastens onto rear wall 38' of storage member 24' by means of a suitable lock mechanism, shown schematically at 100.

Referring now to FIGS. 3A–3D, the illustrated embodiment is generally similar to that of FIGS. 2A–2D, in that the tailgate 20" is of full size and that, when storage member 24" is extended, it is covered by the tailgate.

In the present embodiment however, the tailgate 20" is a single, rigid clement. In order to provide proper closure of the storage member 24", the side walls 34" of the storage member are formed so as to have generally upwardly extending portions 102, which have top edges 104 configured to meet with edge portions 106 of the tailgate 20" along common interfaces. Preferably, at least the upper extensions 102 of the side walls 34" are formed from a generally transparent material, such as polycarbonate, thereby not to obscure the rear side vehicle windows 108. Furthermore, the bottom edge 110 of tailgate 20" fastens to and locks together with rear wall 38" of storage member 24", preferably by means of tailgate lock 112.

Referring now once again to FIGS. 1A–4, the rear wall 38 may also be adapted for selectable pivoting about rear edge 30 of floor portion 26 between the position shown in full lines, and a generally horizontal or flat position indicated in broken lines in FIG. 4. There is also provided apparatus 114 (FIG. 4) for selectably locking wall 38 in the upright position, typically in the form of snap type fasteners, or by a suitable lock, typically a key-operated lock, as indicated schematically at 116 in FIGS. 1A–1D, 2B–2D, 3B–3D and 4.

It will be appreciated that release of the rear wall 38 and pivoting thereof to the illustrated flat position facilitates both easier access to the interior of storage member 24, as well as the possibility of further extending the available carrying depth of the vehicle, and, in addition, facilitating carrying of very long articles without having to travel with the tailgate open or tied down with string as with the prior art.

It will be appreciated by persons skilled in the art that the scope of the present invention is not limited by what has been shown and described hereinabove, merely by way of example. Rather, the scope of the present invention is limited solely by the claims, which follow:

I claim:

1. An expandable storage system for a vehicle having a rear storage compartment which has side walls and a floor area, and wherein access is gained to the storage compartment via a rear opening across which is mounted an upwardly opening tailgate for selectable closing and opening of the rear opening, wherein said system comprises:
- an extendible storage member comprising;
  - a floor portion for supporting luggage therein, said floor portion having front and rear edges and side edges extending therebetween; and
  - a pair of parallel side wall portions connected to said side edges of said floor portion so as to extend transversely upward therefrom, thereby to prevent undesired lateral movement of luggage supported thereon;
- means for mounting said extendible storage member within the storage compartment such that said pair of side walls have a generally parallel orientation to the side walls of the storage compartment, including means for permitting selectable movement of said extendible storage member along an axis parallel to said side walls between retracted and extended positions,
- wherein, in said retracted position, said extendible storage member is contained entirely within the vehicle storage compartment for storing luggage therewithin,
- and wherein, in said extended position, said extendible storage member protrudes rearwardly from said storage compartment through said rear opening so as to expose a major portion of the floor of the vehicle storage compartment and thereby to increase the total floor area available for storage,
- wherein said means for permitting selectable movement of said extendible storage member comprises:
  - extension means for normally urging said extendible storage member from said retracted position to said extended position; and
  - means for selectably locking said extendible storage member in said retracted position, including means for selectably releasing said extendible storage member, thereby to permit extension of said storage member by said extension means.

2. A system according to claim 1, wherein said extendible storage member has front and top openings, and wherein said system also comprises means for selectably closing at least said top opening thereby to permit loading of luggage therethrough.

3. A system according to claim 2, wherein said extendible storage member also has a rear wall associated with said rear edge of said extendible storage member, and wherein, in said retracted position, said extendible storage member rear wall is flush with the vehicle rear opening thereby to extend across the width thereof and so as also to extend upward so as to leave a predetermined portion of the vehicle rear opening uncovered.

4. A system according to claim 3, also comprising a tailgate which is operative, in a closed portion, to extend across and close the uncovered potion of the vehicle rear opening.

5. A system according to claim 2, wherein said means for selectably closing comprises a tailgate mounted across the rear opening of the vehicle.

6. A system according to claim 5, wherein said extendible storage member extends across the width of the vehicle storage compartment and further extends upward such that when said extendible storage member is in said extended position, a predetermined portion of the vehicle rear opening remains uncovered, and wherein said tailgate means comprises upper and lower potions, said upper portion being hingedly attached along an upper edge thereof to a roof potion of the vehicle adjacent to the rear opening, and said lower portion being hingedly attached to a lower edge of said upper portion, along a hinge axis generally parallel to the vehicle storage compartment floor, wherein, when said extendible storage member is in said retracted position, said tailgate means may be closed so as to extend across the entire rear opening of the vehicle storage compartment, and further, when said extendible storage member is in said extended position, said lower portions extends across said top opening of said extendible storage member, thereby to close it.

7. A system according to claim 5, wherein said extendible storage member side walls have top edge portions which are configured to meet with predetermined portions of said tailgate means so as to define common interfaces therebetween.

8. A system according to claim 5, wherein said extendible storage member also has a rear wall associated with said rear edge of said extendible storage member.

9. A system according to claim 3, wherein said rear wall is mounted for selectable pivoting about said rear edge of said floor portion, and wherein said system also comprises:
- means for locking said rear wall in an upwardly extending orientation relative to said floor portion, and for releasing said rear wall so as to permit it to take up an orientation generally coplanar with said floor portion, thereby further extending the available luggage support area of said extendible storage member.

10. A vehicle comprising:
- a rear storage compartment having side walls and a floor area, and wherein access is gained to said storage compartment;
- an upwardly opening tailgate mounted across a rear opening of said storage compartment for selectable closing and opening thereof; and
- a selectably extensible extendible storage member comprising:
  - a floor portion for supporting luggage thereon, said floor portion having front and rear edges and side edges therebetween; and
  - a pair of parallel side wall portions connected to said side edges of said front portion so as to extend transversely upward therefrom, therby to prevent undesired lateral movement of luggage supported thereon;
- means for mounting said extendible storage member within said storage compartment such that said pair of side walls have a generally parallel orientation to said side walls of said storage compartment, including means for permitting selectable movement of said extendible storage member along an axis parallel to said side walls between retracted and extended positions,
- wherein, in said retracted position, said extendible storage member is contained entirely within said vehicle storage compartment for standing luggage therewithin,
- and wherein, in said extended position, said extendible storage member protrudes rearwardly from said storage compartment through said rear opening so as to expose a major portion of said floor of said vehicle storage compartment and thereby to increase said total floor area available for storage,
- and wherein said means for permitting selectable movement of said extendible storage, member comprises:

extension means for normally urging said extendible storage member from said retracted position to said extended position; and means for selectably locking said extendible storage member in said retracted position, including means for selectably releasing said extendible storage member, thereby to permit extension of said storage member by said extension means.

11. A vehicle according to claim 10, wherein said extendible storage member has front and top openings, and wherein said system also comprises means for selectably closing at least said top opening, thereby to permit loading of luggage therethrough.

12. A vehicle according to claim 11, wherein said extendible storage member also has a rear wall associated with said rear edge of said extendible storage member, and wherein, in said retracted position, said extendible storage member rear wall is flush with said vehicle rear opening thereby to extend across the width thereof and so as also to extend upward so as to leave a predetermined portion of said vehicle rear opening uncovered.

13. A vehicle according to claim 12, also comprising a tailgate which is operative, in a closed position, to extend across and close the uncovered portion of said vehicle rear opening.

14. A vehicle according to claim 11, wherein said means for selectably closing comprises a tailgate mounted across said rear opening of said vehicle.

15. A vehicle according to claim 14, wherein said extendible storage member extends across the width of said vehicle storage compartment and further extends upward such that when said extendible storage member is in said extended position, a predetermined portion of said vehicle rear opening remains uncovered, and wherein said tailgate means comprises upper and lower portions, said upper portion being hingedly attached along an upper edge thereof to a roof portion of said vehicle adjacent to said rear opening, and said lower portion being hingedly attached to a lower edge of said upper portion, along a hinge axis generally parallel to said vehicle storage compartment floor, wherein, when said extendible storage member is in said retracted position, said tailgate means may be closed so as to extend across the entire rear opening of said vehicle storage compartment, and further, when said extendible storage member is in said extended position, said lower portions extends across said top opening of said extendible storage member, thereby to close it.

16. A vehicle according to claim 14, wherein said extendible storage member side walls have top edge portions which are configured to meet with predetermined portions of said tailgate means so as to define common interfaces therebetween.

17. A vehicle according to claim 14, wherein said extendible storage member also has a rear wall associated with said rear edge of said extendible storage member.

18. A vehicle according to claim 12, wherein said rear wall is mounted for selectable pivoting about said rear edge of said floor portion, and wherein said system also comprises:

means for locking said rear wall in an upwardly extending orientation relative to said floor portion, and for releasing said rear wall so as to permit it to take up an orientation generally coplanar with said floor portion, thereby further extending the available luggage support area of said extendible storage member.

* * * * *